Sept. 29, 1959     A. LAUDEL, JR     2,906,897
ELECTRICAL SIGNALING SYSTEM
Filed Nov. 12, 1957     7 Sheets-Sheet 1
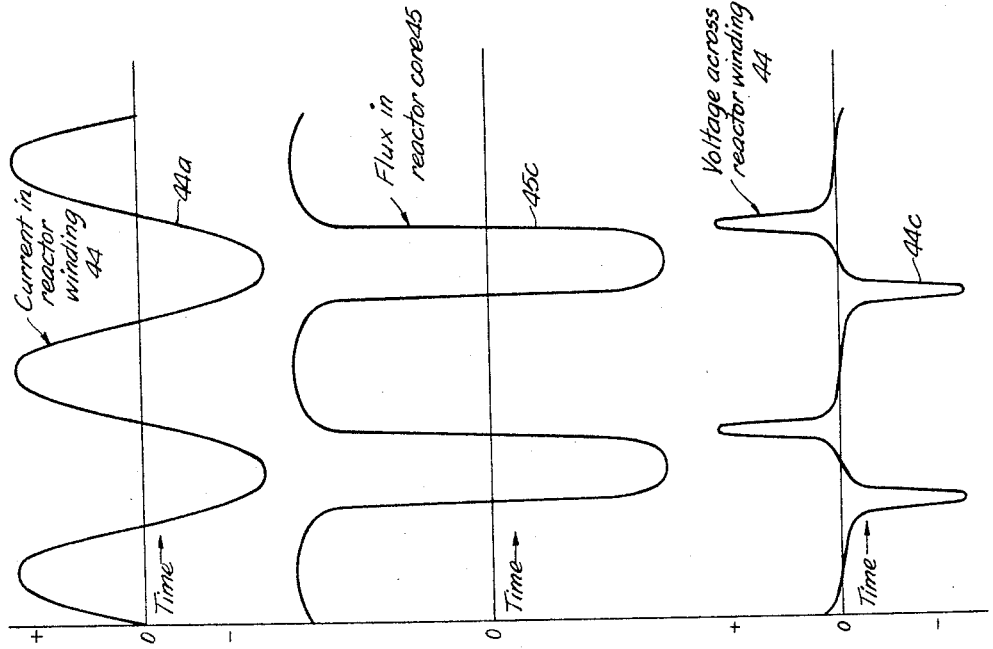
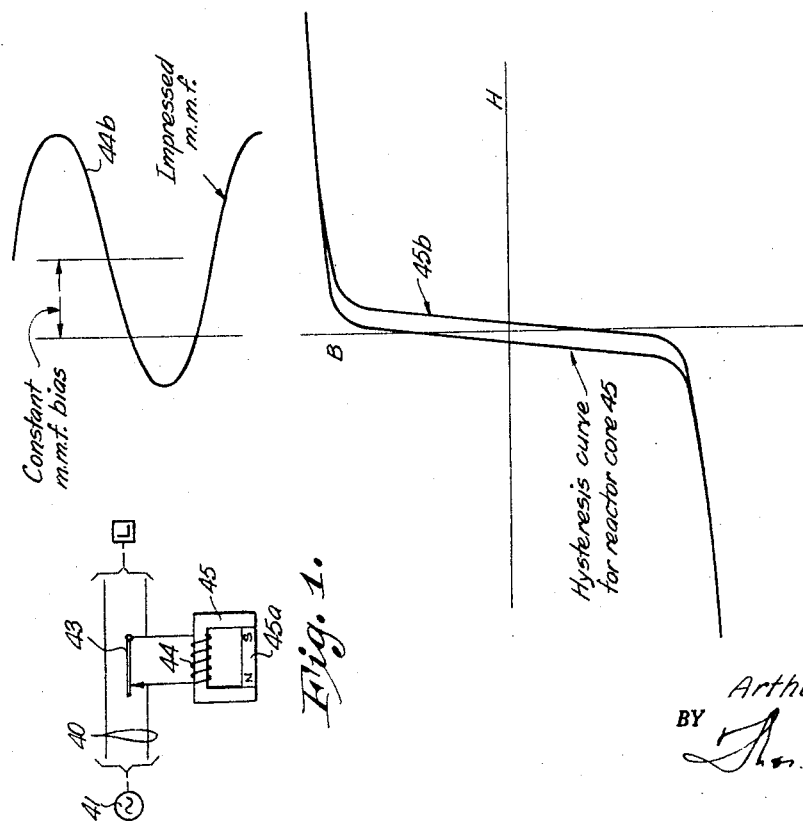
INVENTOR.
Arthur Laudel, Jr.
BY
ATTORNEY.

Sept. 29, 1959      A. LAUDEL, JR      2,906,897

ELECTRICAL SIGNALING SYSTEM

Filed Nov. 12, 1957      7 Sheets-Sheet 2

INVENTOR.
Arthur Laudel, Jr.
BY
ATTORNEY.

INVENTOR.
Arthur Laudel, Jr.
BY
ATTORNEY.

Sept. 29, 1959  A. LAUDEL, JR  2,906,897
ELECTRICAL SIGNALING SYSTEM
Filed Nov. 12, 1957  7 Sheets-Sheet 5

INVENTOR.
Arthur Laudel, Jr
BY
ATTORNEY.

Sept. 29, 1959   A. LAUDEL, JR   2,906,897
ELECTRICAL SIGNALING SYSTEM
Filed Nov. 12, 1957   7 Sheets-Sheet 6

INVENTOR.
Arthur Laudel, Jr.
BY
ATTORNEY.

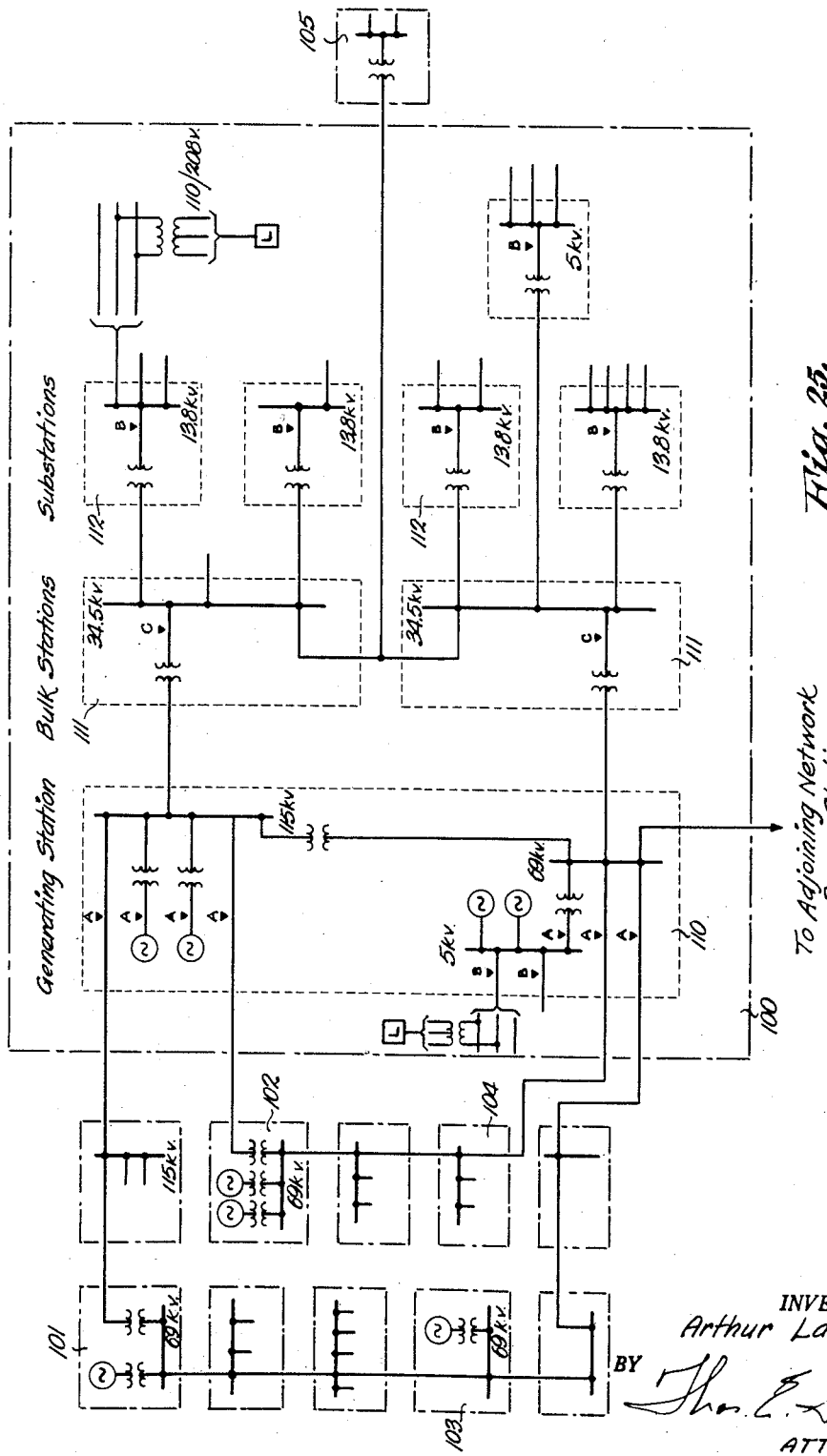

United States Patent Office 2,906,897
Patented Sept. 29, 1959

2,906,897
ELECTRICAL SIGNALING SYSTEM

Arthur Laudel, Jr., Kansas City, Mo., assignor, by mesne assignments, to the United States of America as represented by the Office of Civil and Defense Mobilization Application November 12, 1957, Serial No. 695,613

32 Claims. (Cl. 307—140)

The present invention relates in general to electrical signaling for the purpose of actuating or otherwise influencing signal responsive devices located at a distance from the signal source.

More particularly, it is concerned with the use of existing transmission lines and networks (e.g., those employed by public and private utilities for the distribution of electric power) for auxiliary signaling and/or control purposes. These purposes sometimes may be related to the principal function of the existing transmission system, as for example, where an electric utility company desires to control water heaters or other selected electrical loads at the consumer's premises; or where the company desires to utilize its own lines for controlling the operation of switching apparatus at remote unattended substations. On the other hand, the auxiliary signaling sometimes may be desired for purposes not related, or only indirectly related, to the principal function of the existing network, as is true, for example, when the electric power supply lines are to be employed for receiving fire alarm signals at a central point from outlying locations, or are to be used to transmit air raid or other disaster warnings outwardly from a central location, or to perform telemetering operations from point to point, or to simultaneously operate teletype apparatus at a number of geographically spaced points.

Broadly speaking, it is the object of my invention to provide, as an adjunct to an existing transmission system or network (or to transmission lines which are used for other purposes) a signaling system capable of carrying out any or all of the aforementioned functions, as well as others of kindred or analogous nature.

In this connection, it is my further purpose to provide an auxiliary signaling system which when employed with a commercial power supply network is completely comcompatible with the design and operational characteristics of the latter, however complex it may be, and which in no way impairs or interferes with the normal operation of the power system or any of the apparatus connected thereto.

Another object is to provide a signaling system whose reliability, flexibility and usefulness are immeasurably enhanced by the simultaneous transmission of signals differing in character but not in kind, the kind of signal being compatible with the transmission media and suited for long-distance transmission, and the respective signals being so related in character as to permit easy differentiation between them when needed or, alternatively, use of them to complement one another where that may be desirable.

A further aim of my invention is to provide a signaling system having a novel means for originating signals, whereby the system affords great reliability as to signal transmission and reception, as well as rejection of false or spurious signals and the like; among the advantages of my novel signal originating means are extreme simplicity, long life and great stability with little or no maintenance, ease of installation, comparatively low initial cost, negligible cost of operation, and numerous other advantages that will become apparent hereinafter.

The idea of signaling over the lines and feeders of a power supply network is, of course, far from new. Carrier current systems, for example, are well known. In most cases they, like other signal injection systems, ordinarily rely upon a motor-generator set or frequency changer as the source of signal, this commonly being introduced into the power lines through a filter network. By way of contrast, my system employs no rotary equipment nor, indeed, any moving equipment at all, save only, in some instances, a switch which may be employed to effect the changeover from non-signaling to signaling condition.

Other than the carrier currnet or signal injection systems just mentioned, most arrangements heretofore proposed (a few of which have enjoyed limited use for special purposes in this country or abroad) have fallen generally into three classes; voltage dip or rise systems, voltage outage systems, and subharmonic systems. Out of necessity, some of these are combined with quite elaborate coding arrangements to prevent false alarms, and all of them have one or more additional shortcomings (high initial cost, complicated mechanism, high upkeep, lack of reliability, injurious effect upon the power station or consumer's equipment or impairment of the operation thereof, etc.).

All of these shortcomings are avoided in the present invetnion, largely due to what is believed to be a fundamentally new approach to the problem of signaling over commercial power supply lines. Unlike signal injection systems, I do not in reality inject any new current or power at all into the power line at the point where the signal is originated, and hence it will be obvious that no injection filter arrangements are necessary. Properly speaking, I take advantage of the current already flowing in the power line and modify this in a manner which yields the desired signal. In a sense this is what is done in various voltage dip systems that have been imposed in the past; but whereas voltage dip systems may result in brief reductions in the line voltage to a value as low as 20 percent of normal (even to zero in voltage outage systems), my arrangement avoids severe reductions, and I have found from actual tests thereof, as well as from power network analyzer studies, that line voltage ordinarily can be maintained at close to 99 percent of its normal value during signaling with my apparatus. Occasionally, but very rarely, use of my signaling means may produce a slightly greater reduction.

According to my invention, signaling may be said to be accomplished by utilizing a very small proportion of the alternating current normally flowing in the power line and converting this into certain useful harmonics of the fundamental power line voltage, these serving to modify the existing power current to a slight degree and being receivable by conventional apparatus of the tuned frequency or frequency discriminating type.

As previously indicated, the creation of these harmonics can be effected without motion, the signal source being passive in character. This source employs what I have chosen to call a harmonic signal inductor. The essential component is an inductive reactor which is connected to the power line and which has, with respect to the excitation received from the power line, an asymmetric hysteresis characteristic that is either inherent in the physical design of the reactor or is incorporated therein electrically by subjoined biasing elements that likewise are passive in nature.

With my harmonic signal inductor I am able, without serious effect upon the power line voltage, to produce the second, third, fourth, fifth and sixth harmonics of that voltage in magnitudes sufficient for signaling purposes. By proper design it is possible to accentuate the magnitude of certain harmonics at the expense of others, and for practical purposes I find it often desirable to do this. For signaling over the lines and feeders of the typical power supply network, for example, I prefer to use the second and/or fourth harmonics of the fundamental power line voltage wave, but it will be understood that for other forms of transmission lines and other situations one or more of the other harmonics may serve equally well or better; as a matter of fact, even for power network usage there are instances when the fifth harmonic can be employed to advantage, but this is not always the case, whereas the second and fourth harmonics have been found always to give consistently good results. Only rarely will the third and sixth harmonics serve the purpose, inasmuch as these are suppressed by every delta-Y transformer encountered en route from the signal source to the receiver. (Power companies have preferred to install transformers delta-Y or, where this is impossible, to use transformers having delta-tertiary windings for the very purpose of suppressing the third harmonic, inasmuch as this is produced by the generators and distribution transformers themselves under normal conditions.)

A number of the features and advantages of my signaling system and the apparatus employed therein will be evident from the foregoing, but there are many others, some of which will be self-evident and others perhaps less apparent on their face. To mention a few:

(1) My arrangement can be employed on any power line or network, whether it be 60 cycle, the accepted standard frequency for power transmission in this country or whether it be the 50 cycle European standard frequency. (It will be convenient in this specification to use 60 cycles when referring to the frequency of the power current but this, of course, is not intended to be limiting.)

(2) Even if there should be a malfunction of the switch employed on my harmonic signal inductor, it will not harm any of the components inasmuch as these are capable of continuous duty, whatever the position of the switch may be. However, the switch employed can be a vacuum switch having a motion of but a fraction of an inch, and since these are rated in terms of hundreds of thousands of operations, there is little danger of malfunction and they present no significant maintenance problem.

(3) The signal produced by my harmonic signal inductor can be coded in any desired fashion by operation of the switch just mentioned. Coding may sometimes be desirable in order to obtain selective operation of receivers, or the like; however, elaborate coding of signals is not necessary in order to prevent false operations, as is often true in other systems. The signals produced by my harmonic signal inductor are, in other words, readily receivable by inexpensive receiving equipment which does not need to rely upon coding in order to safeguard against false operation.

(4) My harmonic signal inductor can be installed without interruption of service to the consumers who receive power from the supply network.

(5) The harmonic inductor can be installed at any place in the power supply or distribution network regardless of the system voltage at the point of insertion.

(6) The harmonic signal inductor requires less space than a carrier type installation of comparable capacity, and all of the equipment can be weather-proof in design for outdoor installation.

(7) My harmonic signal inductors can, if desired, be installed at a plurality of widely separated points in a power distribution system; and when so installed they can be made to operate in parallel merely by setting them up with similar excitation polarities throughout the system, whereby signal cancellation or interference from separate sources is eliminated or reduced to a harmless level. In specific situations, if it is desired to obtain signal cancellation (and this sometimes may be desirable), the polarities may be alternated to accomplish this.

(8) Exceedingly little power is required by my signaling system either for signaling purposes or in the course of stand-by operation. Where it is employed for widespread distribution of a general signal intended for the public at large, cost studies show that production of a one-second signal in an area containing approximately 350,000 homes would be in the neighborhood of two cents.

(9) With my harmonic signal inductor, it is possible to produce in the power line a signal which is relatively independent of the power load on the line. This can be made a matter inherent in the design of the unit, or if desired, auxiliary means can be employed to obtain automatic regulation of the level of the induced signal voltage in accordance with the over-all load on the system, or on any particular portion thereof.

(10) The character of signal produced by my harmonic signal inductor is such that power factor capacitors in the regular power supply network do not require blocking filters. As previously indicated, injection filters likewise are not necessary. This is important not only because it represents a substantial saving in cost but also because such filters ordinarily attenuate the signal approximately 50 percent at the point of origin. By avoiding this initial signal loss my arrangement achieves considerably greater efficiency than possible in injection signal systems.

(11) Transmission of the auxiliary signal produced by my harmonic signal inductor has no tendency to cause power system instability. There need be no interruption of the conventional electric power service in the course of transmitting the signal nor does transmission thereof have any ill effect upon lamps, television receivers, appliances and other conventional equipment connected to power lines.

Other objects and features of my invention will appear in the course of the following description. In the drawings which form a part of the specification and are to be read in conjunction therewith, and in which like reference numerals refer to like parts in the various views:

Fig. 1 is a diagram showing a very elementary form of my harmonic signal inductor and illustrating the manner in which it is installed on a single phase power distribution line for the purpose of controlling remote signal receivers;

Fig. 1a is a set of curves graphically illustrating various relationships that exist in the harmonic signal inductor of Fig. 1 during signal transmission;

Figure 8:
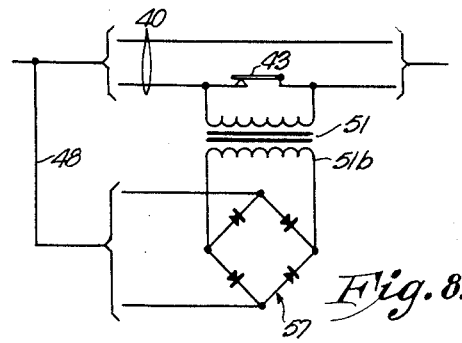
Figure 9:
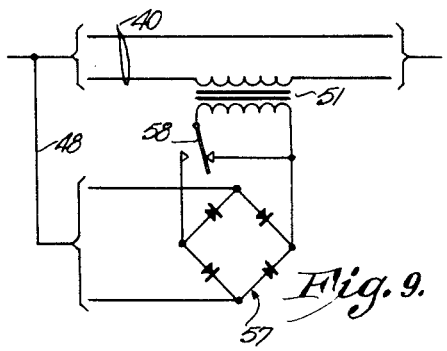
Figure 11:
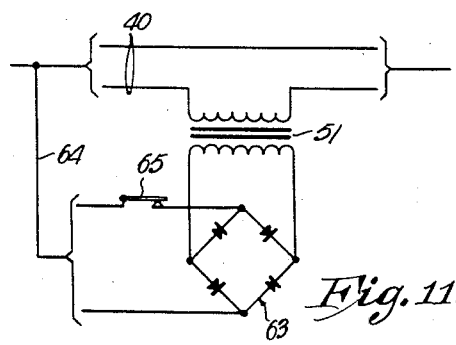
Figure 10:
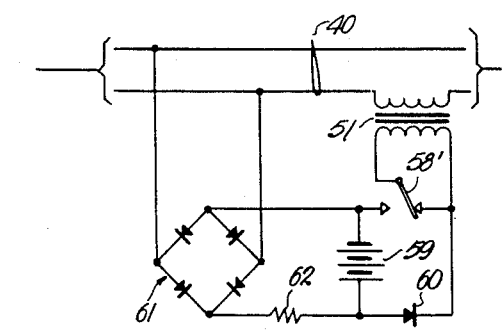
Figure 12:
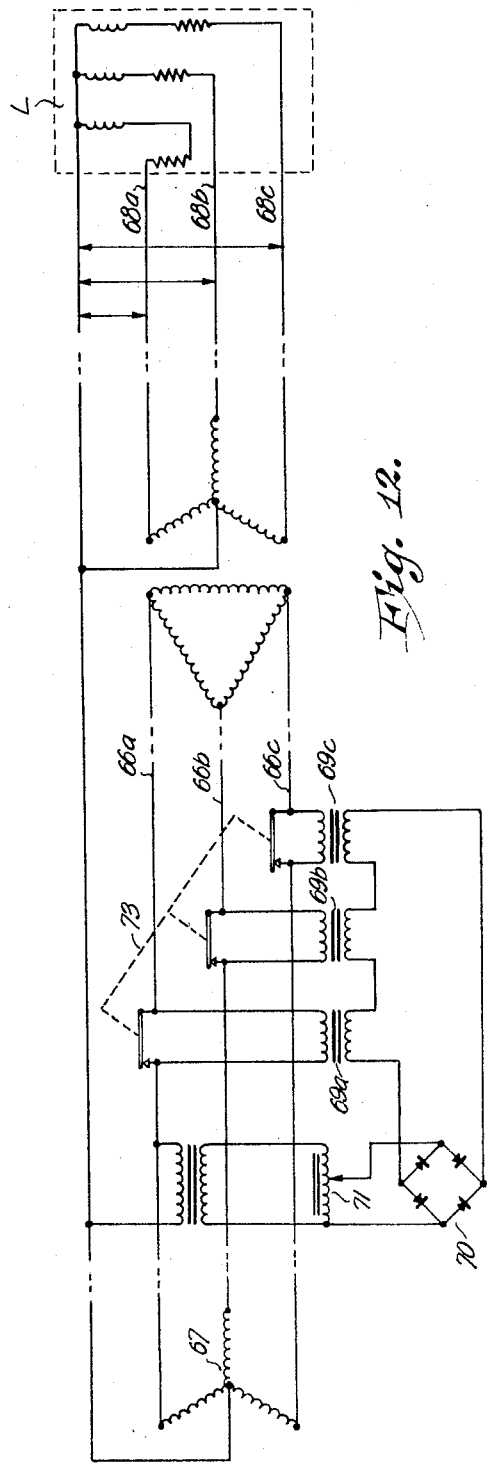
Figure 12C:
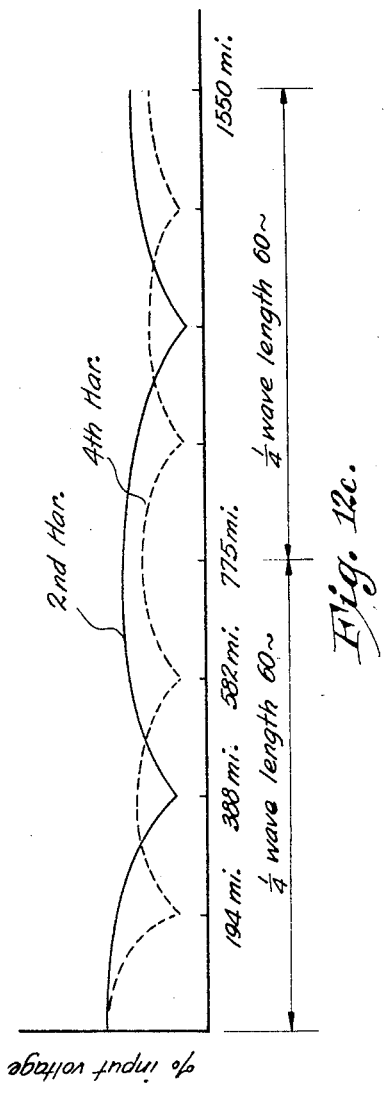
Figure 12A:
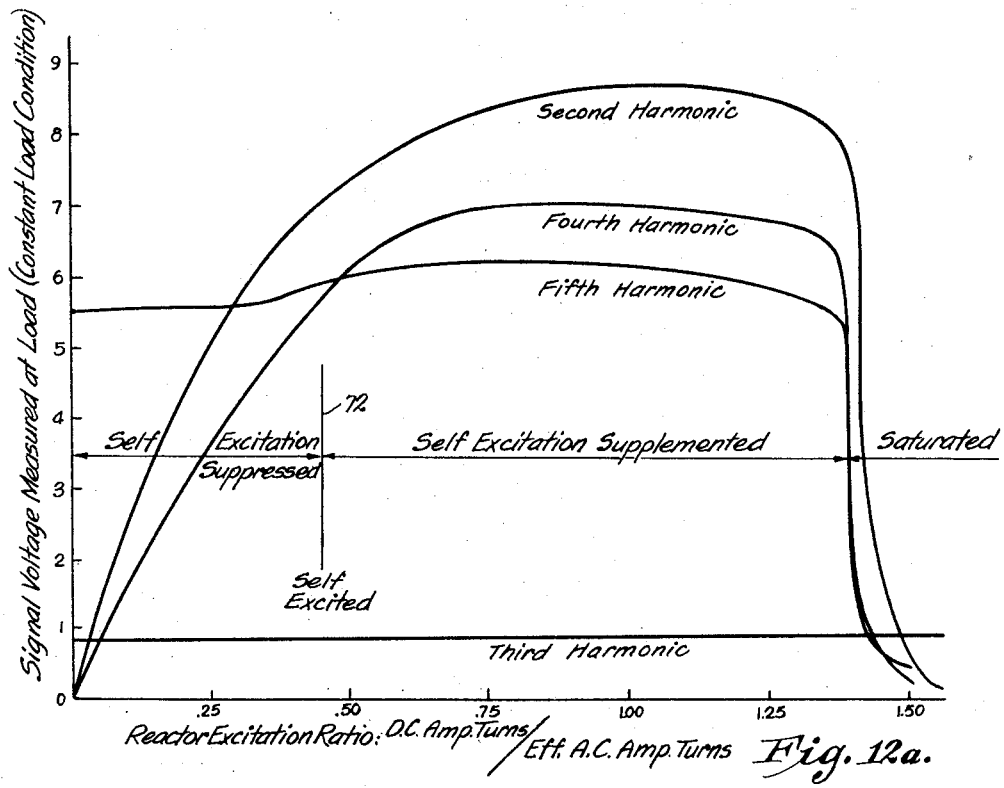
Figure 12B:
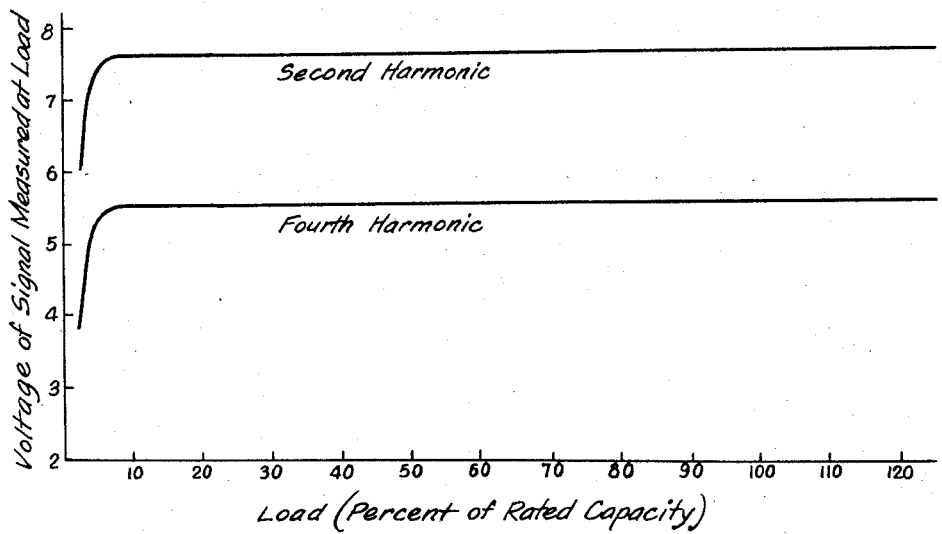

Figs. 4 to 7, inclusive, show single phase power distribution lines to which are connected various additional types of harmonic signal inductor, each employing a self-exciting asymmetric reactor;

Figs. 8 to 10, inclusive, are circuit diagrams showing, in connection with single-phase power distribution lines, use of other modified forms of my harmonic signal inductor, wherein the asymmetric inductive reactor has external direct current excitation supplementing self-excitation;

Fig. 11 is a diagram showing the application to a singe phase power line of a further embodiment of my harmonic signal inductor, wherein the changeover from non-signaling to signaling condition is effected by shifting the inductive reactor from a normal condition of high saturation to a condition of asymmetry with reference to the applied alternating current excitation;

Fig. 12 is a circuit diagram illustrating a typical way of installing my improved harmonic signal inductor on a three-phase power distribution line;

Fig. 12a is a graph comprising a family of curves which reflect changes that occur in the harmonic content of the signal measured at the 60 cycle power load in Fig. 12 under different conditions of direct current excitation of the harmonic signal inductor shown in that figure;

Fig. 12b is a graph reflecting the changes which occur in the second and fourth harmonic content of the signal measured at the 60 cycle power load of Fig. 12, as the magnitude of said load changes and when the harmonic signal inductor is operated without external direct current excitation;

Fig. 12c is a graph illustrating changes which occur in the signal level of the second and fourth harmonics along the length of a 1550 mile long transmission line when my harmonic signal inductor is arranged to introduce its signal close to one end of said line;

Figs. 13 to 24, inclusive, are circuit diagrams showing alternative forms which my harmonic signal inductor can take when its purpose is to induce signals in three-phase power distribution lines; and Fig. 25 is a simplified one-line circuit diagram of a typical three-phase power distribution network showing various points at which my harmonic signal inductor can be connected.

Although other uses of my novel signaling arrangement will be readily apparent to those versed in the art, its primary field of intended application is for signaling over the lines and feeders of power distribution networks. In this connection it is particularly applicable to the transmission of signals for the purpose of alerting the public at large in times of national or area-wide emergency and/or for alerting key individuals (firemen, policemen, etc.) who need to be signaled on the basis of occupational classification but without arbitrary restriction as to their geographical location.

Before proceeding with the description of the arrangement and operation of my apparatus, note should perhaps be made of the fact that there are a number of considerations which make electric power distribution networks preferable over telephone networks or radio broadcasting for the transmission of warning signals to the public at large, or to selected cross sections of the public. The major one resides in the fact that 99 percent of the people in critical defense areas have electric power service while for the country as a whole the figure is 95 percent; telephone lines reach a much smaller portion of the population. Radio alarm coverage using existing facilities is seriously limited by the fact that only a few broadcasting stations and a comparatively small proportion of radio receivers are operated on a twenty-four hour day basis; to overcome this limitation would require setting up special broadcast stations and establishing new channels of signaling for this one express purpose, not to mention the fact that the receivers would have to be of special design and quite costly on an initial basis as well as expensive to operate on a continuous stand-by basis. The operation of most radios and associated audible alarm equipment requires the 60 cycle network as a source of power and reliability of this type of signal is limited to the reliability of the power network as is reception of a signal from my harmonic signal inductor. Telephone lines are inadequately powered to ring all phones in the community at once, and such would not be desirable in any event, for to do so would only tie up the telephone system through confusion of the alarm with a normal phone call. A power distribution network, on the other hand, is not subject to being fouled by the consequences of the reception of alarms. Additionally, it is, of course, adequately powered to operate all alarms simultaneously, and the continuity with which regular power service is maintained in actual practice makes the network available for auxiliary signaling at virtually all times, day or night.

Although the maximum effectiveness of my novel signaling arrangement is realized in its application to polyphase power systems of the type regularly employed by public and private utilities companies engaged in the generation and distribution of electric power on a commercial basis, it can also be utilized in single phase lines and networks. And notwithstanding the fact that use in a single phase system does not obtain all of the advantages that can be achieved when my invention is used in three-phase systems, the single-phase arrangements are generally simpler and easier to understand, so it will perhaps be well to begin by describing the invention in connection with them.

Referring first to Fig. 1, the rather elemental system shown therein has a two-conductor power line 40 forming part of the path via which alternating current power is fed from a source 41 to a customer's load 42. The showing of a single source 41 and a single load 42 is intended only to be exemplary for it represents a situation not ordinarily encountered in practice. Much more common is the situation in which there are multiple sources and/or multiple loads with a labyrinth of interconnections between them including as part of the network a line such as 40. While these factors complicate the transmission of signals they will be disregarded for the moment and all sources from which line 40 receives power will be considered as lumped at 41; and likewise all loads to which power may be fed through the line will be considered lumped at 42.

Connected to one conductor of line 40, but bridged by a normally closed contact 43, is the winding 44 of an inductive reactor having a core 45. Three legs of the core are formed of suitable magnetic material while the remaining leg 45a is a permanent magnet having properties of good permeability coupled with high retentivity.

Elements 43, 44, 45 and 45a form the harmonic signaling inductor of the simple power distribution system shown. Signaling is effected by opening and closing contact 43 which may be done a single time or which may be repeated in order to send a coded signal. So long as contact 43 remains closed and coil 44 is short circuited thereby, it will be obvious that the inductor no wise effects the current flowing in line 40 nor is it in any way influenced thereby. However, if contact 43 now is opened for a brief interval winding 44 is inserted in series with the lower conductor of line 40 and the entire load current thus flows therethrough. The resulting drop in the voltage at the load ordinarily will be in the order of about 1 percent; only in rare instances need the drop be greater than this in order to produce a signal of adequate level for reception, but a drop of as much as 5 percent for the brief interval required for signaling is not serious, so far as having adverse effect upon the operation of equipment that may be connected to the line.

The results stemming from the series insertion of winding 44 in the power line will be understood from consideration of Fig. 1a where the hysteresis loop (or conventional B/H curve) of the core 45 is shown at 45b. The sinusoidal current 44a passing through the winding 44 produces a generally sinusoidal magnetomotive force 44b but this is not symmetric with respect to the axis of the hysteresis loop; instead, because the core is in part a permanent magnet acting on the magnetic circuit with a fixed magnetomotive force, the core's hysteresis loop always occupies a position which is asymmetric with respect to the axis of the sinusoidal magnetomotive force 44b. Accordingly, the flux in the core alternates in direction and magnitude in the fashion shown by curve 45c and this in turn induces in winding 44 a voltage wave substantially as shown at 44c. The specific wave shape will of course vary with different core materials and other factors involved in the design of the asymmetric inductive reactor but the one illustrated is rather typical. The induced voltage wave is composed of harmonics of the fundamental 60 cycle wave, the higher order harmonics being present in progressively diminishing proportions. For signaling purposes the second, third, fourth, fifth and sixth harmonics are induced in sufficient strength to warrant their consideration and of these the second and fourth harmonics have been found superior to the third, fifth and sixth in most situations encountered in practice.

Referring again to Fig. 1, the harmonics induced in line 40 on opening of contact 43 produce a signal which tends to be propagated upstream toward the generating source 41 and downstream toward the load 42, the relative signaling strength in the two directions being governed mainly by the relationship between the impedance looking upstream from the point of origin as compared with that looking downstream. Generally speaking the greater signal strength will be in the direction of greater impedance, but the relationship is not a linear function, nor is the matter of the relative impedance in two directions easy to determine without taking into consideration the special situation which exists at each point of insertion of one of my harmonic signal inductors. Remembering that line 40 may in actual practice be connected in parallel with another line linking part or all of the power sources and loads served by line 40, it can be appreciated that if a harmonic signal inductor also is inserted in the other line, it can be so inserted as to operate in parallel with the one shown in Fig. 1 or in opposition thereto, depending upon the relative polarization of the two permanent magnets. In most situations it is desirable for paralleled harmonic signal inductors to be polarized similarly so that the harmonics will have the same or close to the same phase relationship. However, if cancellation of the signal in an upstream direction or in a downstream direction is desired, this ordinarily can be accomplished by properly selecting points for the insertion of two harmonic signal inductors in the network, the two being connected in reversed polarity relation.

It will be understood, of course, that a harmonic signal receiver or receivers can be connected to the line 40 at points located either upstream or downstream from the harmonic signal inductor. The receivers may be of the tuned frequency or frequency discriminating type so as to respond only to the desired harmonic or combination of harmonics. Likewise, if transmission of a coded signal by contact 43 is desired, they can be arranged to receive the code and act in accordance therewith, all as is well known in the art.

However, as previously mentioned, it has been found that when the second and/or fourth harmonics are used no elaborate coding is necessary in order to guard against spurious operation of the receiver. This stems in part from the fact that the ambient level of second and fourth harmonics of the power frequency is normally so low as to be scarcely measurable or not measurable at all. Also, second and fourth harmonics introduced into the network as transients resulting from faults or the like are extremely short in duration—usually about five milliseconds—so that spurious generation of these harmonics can easily be rejected by incorporating a small time delay in the design of the receiver. By way of contrast the ambient level of the third and fifth harmonics of the fundamental 60-cycle voltage normally is found to be in the region of one to three volts. Higher voltages of these odd harmonics also occur frequently under fault conditions and design of my signaling system using odd harmonics for control purposes therefore would require a relatively high voltage signal in addition to some form of coding in order to avoid false alarms. Using the second and/or fourth harmonics receivers of conventional design will give reliable operation at a signal level of approximately one volt at the receiver; even taking into account attenuation that occurs in transmission, tests show that with my harmonic signal inductor this level of received signal voltage is very easily achieved—indeed I have found it possible to achieve many times this signal level in actual test operations.

Figure 2:
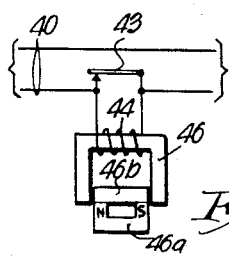
Figs. 2 and 3 are diagrams showing different forms of asymmetric reactor construction that may be employed in my harmonic signal inductor.

A signal containing essentially the same harmonics as have been discussed in connection with Fig. 1 can also be obtained if the construction of the magnetic circuit of the asymmetric reactor is modified as shown in Fig. 2. Here in lieu of the permanent magnet 45a I employ a permanent magnet 46a which may be characterized as having high retentivity but low permeability. Across the poles of the magnet there is a high permeability keeper leg 46b whose ends are maintained in slightly spaced relation from the lower extremities of the C-shaped core member 46, the latter also being of high permeability. The air gaps thus provided are very small, and the cross-sectional area of member 46b is approximately half the cross-sectional area of member 46.

The permanent magnet 46a provides sufficient flux to fully saturate the keeper member 46b and considering the situation which exists when contact 43 is opened, it will be seen that the magnetomotive force produced by winding 44 tends on one-half cycle to try to drive flux through the already saturated member 46b while on the opposite half cycle it tends to desaturate the member. Under the first condition the already saturated member 46b can carry no additional flux and it acts very much as if it had been removed from the magnetic circuit leaving a large air gap between the lower extremities of the C-shaped core member 46; under the reverse condition, the flux in keeper member 46b is reduced affording a high permeability path for flux induced by the winding 44. Thus the reactance of this assembly is high on one-half cycle and low on the other, it being inherent in the design of the magnetic path that this change takes place with greater suddenness in one direction than the other. The effect of the reactor can be varied in kind and in degree by changes in the size of the air gap or in the relative strength of magnet 46a or in the relative permeability characteristics of members 46 and 46b; however, it is always asymmetric in character and, as previously suggested, results in the production of the same harmonics as the Fig. 1 arrangement, although these may be somewhat different in relative strength.

Figure 3:
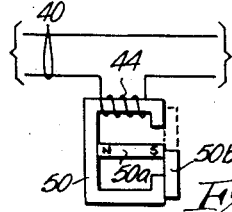

The harmonic signal inductor shown in Fig. 3 also is along the lines of that disclosed in Fig. 1 except that in this instance it is adapted to induce the desired harmonic voltages in power line 40 without the aid of a switch to initiate and terminate signaling. This is accomplished through the use of an inductive reactor having a core 50 of special design. The core is of E shape, the middle crossbar of the E comprising a permanent magnet 50a which has high permeability and high retentivity. The balance of the core is made of high permeability magnetic material and associated therewith is a slidable gate or keeper 50b made of like material.

When the latter member is in the position illustrated all of the flux produced by the permanent magnet 50a circulates in the closed loop formed by gate 50b and the lower half of the core. Accordingly, none of the flux circulates in the upper crossbar of the core 50 on which is mounted the winding 44. So long as this condition prevails no appreciable second or fourth harmonics of the power voltage wave will be induced in line 40. When it is desired to induce those harmonics for signaling purposes it is only necessary to slide the gate 50b from its solid line position to the dotted line position whereupon the flux produced by the permanent magnet 50a will shift its course to the upper half of the core; the result is the same as has been discussed in connection with Fig. 1, which is to say that the desired harmonics of the fundamental power wave will be induced in line 40 and transmitted both upstream and downstream as explained earlier. To terminate signal transmission, gate 50b is moved back to the position in which it is shown in solid lines in Fig. 3. Shifting of the gate from one position to the other has the effect of changing the inductive reactance from a condition of symmetry to one in which it is asymmetric with respect to the sinusoidal power current which excites winding 44. In doing this, and in restoring the inductive reactance to a condition of symmetry, gate 50b serves the same function as did the contact 43 in Fig. 1. The need for a contact in the power circuit thus is obviated.

Having thus seen in the cases of Figs. 1 to 3 that it is the unidirectional biasing flux in the core of the reactor that causes the reactor winding to induce desired harmonics in the power line during signaling (this being due to the asymmetric characteristic given to the reactor by the permanent magnet) it can readily be appreciated that the biasing flux necessary for production of harmonic signals can be obtained by other means than a permanent magnet. Actually, other means for accomplishing this end can be and often are more effective, or they can offer advantages of control, design, flexibility, and/or economy beyond those which are present in the permanent magnet arrangements thus far described.

Figure 4:
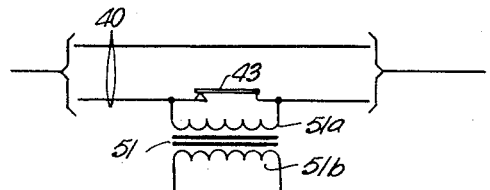

The balance of this specification will be devoted to such alternatives and it will be convenient to begin with that shown in Fig. 4. Like the harmonic signal inductor illustrated in Fig. 1, this employs an inductive reactor 51 whose winding 51a is in series with one conductor of the 60 cycle power line 40, the winding being short circuited by a normally closed contact 43. In the Fig. 4 arrangement, however, the reactor is a transformer having a secondary winding 51b whose ends are bridged by a rectifier 52. Signaling is accomplished in the same way as described in connection with Fig. 1, that is to say, by opening and closing of contact 43. During the time the contact is closed the reactor obviously has no effect upon the current flowing in the power line 40; neither is it in any way influenced by such flow.

However, when contact 43 is opened, the 60 cycle load current passes through winding 51a inducing an alternating voltage in the secondary winding 51b. Rectifier 52, of course, presents very high impedance to flow of current in one direction while having virtually zero impedance as to current flow in the other. Current flow through the rectifier which is begun as the result of induced 60 cycle alternating current voltage of one polarity continues to flow beyond that point at which the voltage wave reverses polarity, this being due to the energy stored in the reactor. In effect, then, the secondary winding 51b and the bridging rectifier 52 act as a direct current source for exciting the reactor core and producing therein a unidirectional flux analogous to that produced by the permanent magnet in Fig. 1. However, the direct current which accomplishes this has a "ripple," so, comparing the result with that illustrated in Fig. 1a, the hysteresis curve of the reactor will be offset asymmetrically with respect to the axis of the applied magnetomotive force (see 44b, Fig. 1a) but the degree of asymmetry will change from instant to instant.

Although self-excitation of the reactor by means of rectified alternating current is not constant in the sense that excitation by a permanent magnet can be considered constant, this is not necessarily a drawback, and indeed the presence of the "ripple" mentioned above can serve to slightly enhance the even harmonic content of the signal produced. By proper design of the transformer used as the reactor, it is possible with the arrangement of Fig. 4 to accentuate some harmonics and suppress others as may be desired. Generally speaking, it is very easy to obtain an average level of self-excitation which will afford proportionately greater even harmonics than odd, as compared with a simple permanent magnet arrangement as in Fig. 1.

Figure 5:
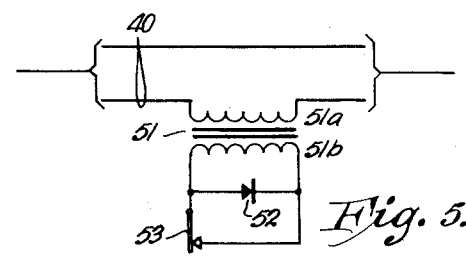

What has been said regarding the arrangement shown in Fig. 4 is also applicable to that shown in Fig. 5. The latter comprises a harmonic signal inductor which is exactly like that of Fig. 4 except that contact 43 normally bridging the primary winding 51a of reactor 51 has been omitted and in lieu thereof a normally closed contact 53 has been substituted across the secondary winding 51b. It will be obvious that when contact 53 is opened the result is precisely the same as obtained by opening contact 43; in other words, there is no difference in the kind of signal transmitted assuming that the design of the transformer 51 and the rectifier 52 is the same in both cases. The only difference which exists in "non-signaling" condition is that the harmonic signal inductor of Fig. 5 remains in series with the line as a transformer whose secondary winding is short-circuited. This means that it will consume a small amount of power while it is in stand-by condition, but this amounts to very little for there is almost no core loss and very little copper loss. Likewise, the voltage drop across the primary is so small as to warrant no concern. More than off-setting any apparent disadvantage of permitting this harmonic signal inductor to remain in the circuit during non-signaling condition is the fact that the switch employed at 53 can be of substantially lower insulation rating than the one employed at 43 in Fig. 4.

Figure 6:
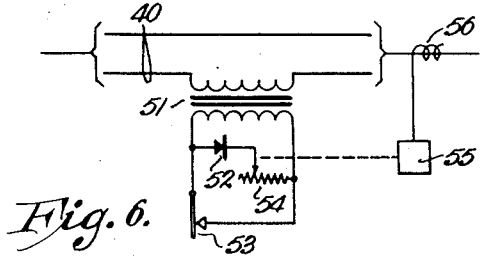

Referring now to Fig. 6, it will be seen that this harmonic signal inductor is exactly like that shown in Fig. 5 except for the fact that a variable resistance 54 has been inserted in series with the rectifier 52. A control unit 55 of known design senses the current flow in line 40 for example by means of a current transformer arrangement illustrated schematically at 56 and automatically adjusts the amount of resistance 54 in series 54 with the rectifier depending upon the magnitude of the load existing on the line 40 at any time. By arranging the control unit 55 to decrease the resistance 54 as the load increases the strength with which the harmonic signal reaches the load can be made to remain relatively constant regardless of the magnitude of the load. It will be self-evident that this is accomplished by varying the self-excitation of the asymmetric reactor under different load conditions.

Figure 7:
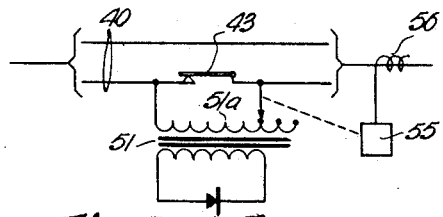

The same result can be obtained in slightly different fashion as shown by Fig. 7. Here the reactor 51 has a tapped primary winding 51a' and control unit 55 is arranged to adjust the taps in accordance with the load sensed at 56. Thus, the number of turns of the primary winding are adjusted to maintain a constant signal level at the load regardless of the magnitude of the load. Except for this self-regulating feature it will be noted that the harmonic signal inductor of Fig. 7 is like that already described in connection with Fig. 4.

Fig. 8 shows another modification of the basic arrangement disclosed in Fig. 4. In this case the single rectifier 52 of Fig. 4 has been eliminated and in place thereof a full wave rectifier bridge 57 is connected to the secondary winding of reactor 51. The rectifier bridge receives alternating current from line 40 via a connection indicated schematically at 48; though not shown, it should be understood that this connection can include a voltage step-down transformer if such is necessary or desirable or it may include resistance or other conventional means for adjusting the value of the input A.C. voltage to the rectifier bridge. If connection 48 were eliminated altogether, it will be seen that the rectifier bridge 57 would function in precisely the same fashion as the single rectifier 52 in Fig. 4. In other words, the asymmetric reactor 51 would be self-excited in just the same way as has already been described. This condition of self-excitation still exists in the Fig. 8 arrangement whenever contact 43 is opened to induce a signal; however, because of the alternating current received via connection 48 this self-excitation is supplemented or augmented by the rectified alternating current also imposed on the secondary winding 51b. Referring to Fig. 1a, let us assume for the moment that curve 45b is the hysteresis curve of the reactor 51 in Fig. 8 while curve 44b reflects the approximate position that the magnetomotive force wave would have with self-excitation of the reactor alone. Augmenting the self-excitation as is done in Fig. 8 will serve to shift the hysteresis loop of the reactor somewhat farther to the left and give the reactor a somewhat greater degree of asymmetry than it would have without externally augmented self-excitation. By properly designing the circuit components in Fig. 8 to give the correct degree of aid in self-excitation, a somewhat higher output level of even harmonics can be obtained without any change in the reactor 51. This is particularly desirable when the harmonic signal inductor is employed in signaling over the transmission lines and feeders of power networks because, as previously indicated, the even harmonics are especially desirable for this purpose.

Like the arrangement of Fig. 8, the one shown in Fig. 9 also employs external or augmented excitation of the reactor 51 through the use of a rectifier bridge 57 in the fashion just described. In this particular arrangement, however, signaling is effected by means of the switch 58 which is shown in "non-signaling" position. When the position of the switch is reversed, the arrangement will duplicate that in Fig. 8 during signaling condition (i.e., with contact 43 open). Thus, what has just been said with reference to obtaining a signal having a greater proportion of even harmonic content applies also to Fig. 9. However, the Fig. 9 arrangement has the advantage over that shown in Fig. 8 of performing the switching operation in a secondary circuit of the reactor 51 rather than the primary. Also, because the secondary is completely short circuited during the non-signaling interval, the harmonic signal inductor of Fig. 9 requires no stand-by excitation current.

The same may be said of the arrangement in Fig. 10 for here again the secondary of the reactor 51 is short circuited by contact 58' during non-signaling. During signaling contact 58' is reversed whereupon a circuit for the secondary winding is completed through battery 59 and rectifier 60. Battery 59 provides a steady state source of direct current excitation to supplement the self-excitation achieved through the use of rectifier 60. The rectifier bridge 61 has little effect so far as signal transmission is concerned because of the resistance 62 in series therewith. Stated differently, the rectifier bridge is in this instance provided only to charge the battery 59 and maintain it in proper stand-by condition at all times; since this can be accomplished by trickle charging the battery resistance 62 can be assumed to be sufficiently large to prevent the rectifier bridge from having any substantial effect so far as the signaling operation is concerned.

Whereas all of the arrangements thus far described have controlled signaling by means of a normally closed contact bridging the primary winding of the reactor or a normally closed contact bridging the secondary winding, the arrangement shown in Fig. 11 represents a fundamental departure from this. Here there is no contact normally bridging either of the windings and the changeover from signaling to non-signaling condition employs a distinctly different principle of switching. Here, there is a rectifier bridge 63 connected across the secondary winding and continuously energized during the non-signaling interval by means of alternating current fed to the bridge via path 64 and the normally closed contact 65. Although the result would appear to be similar to what is obtained through the use of the rectifier bridge in Fig. 8, the components are so chosen that the rectified alternating current continuously fed to the secondary winding of the reactor 51 during non-signaling maintains the latter at a high level of saturation. Referring once more to Fig. 1a, let us assume for the moment that curve 45b is the hysteresis curve of the reactor 51 in Fig. 11; due to the high level saturation, however, the vertical axis of the hysteresis loop is displaced much farther to the left than shown in Fig. 1a—sufficiently far, as a matter of fact, to insure that the upper knee of the curve is displaced to the left beyond the region swept by alternating magnetomotive wave 44b resulting from the alternating current flowing through the primary winding. Stated differently, the degree of saturation is sufficient to overcome the alternating magnetomotive force of the primary winding with the result that the latter is ineffectual to produce any substantial modification of the flux in the magnetic circuit. Under this condition the reactor behaves with reference to its primary winding very much as if it were short circuited even though such is not the case.

Thus referring back to Fig. 11, so long as contact 65 remains closed, reactor 51 offers very little impedance to the flow of 60 cycle current in line 40. When contact 65 is opened, however, the source of saturating current is removed from the secondary winding of reactor 51 and there remains connected to the secondary only the rectifier bridge 63. In this condition the rectifier bridge performs the same function as does the rectifier 52 in Fig. 4 when contact 43 is opened; in other words, during signaling the harmonic signal inductor of Fig. 11 is self-excited in the same fashion as already described and so transmits a signal containing generous quantities of even harmonics. Reclosing of contact 65 again drives the reactor in its earlier degree of high saturation terminating the signal transmission. One of the main advantages of effecting the changeover from signaling to non-signaling condition in this fashion resides in the fact that the switch 65 can be still less costly and more conservatively rated than was true in any of the previously described switching arrangements.

Although the harmonic signal inductors disclosed in Figs. 1–11, inclusive, are all shown in connection with single phase power transmission lines, it should perhaps be mentioned that they can be used just as shown in three-phase or any other polyphase system by treating each phase as a separate line corresponding to the line 40 shown in all of these figures. Although it has not been shown in these figures, it should also be mentioned perhaps that in order to protect the various rectifiers shown in the event there is a fault which induces a substantial transient current on line 40, it is good practice to bridge the rectifier with a non-linear resistor of the silicon carbide type or with a spark gap or with an inductance designed to saturate below the inverse voltage rating of the rectifier. These have been omitted in the interest of simplicity and clarity but it will be understood that some such form of suitable protection for the rectifier should be employed in all cases.

Although, as has been suggested, the single-phase arrangements of my harmonic signal inductor can be used in three-phase or other polyphase systems, the latter lend themselves admirably to obtaining additional advantages by some modification of the arrangements heretofore described. In considering these it will be convenient to start with Figs. 12, 12a and 12b, the first of which represents an actual (not simulated) commercial power line on which my three-phase harmonic signal inductor has been installed and tested; Figs. 12a and 12b are curves based upon data obtained in those tests.

The installation was made in a 7200/13,200 v. line having conductors 66a, 66b and 66c. This was on the downstream side of a delta-wye transformer whose secondary winding is shown at 67; it fed into three single-phase transformers connected delta-wye rated at 500 k.v.a. which stepped the voltage down to 120/208 v. for distribution via lines 68a, b and c to loads (L) which are indicated in the form of lumped constants at the right-hand end of the line as shown in Fig. 12. The harmonic signal inductor in this case comprised three single phase transformers 69a, 69b and 69c, each rated at 10 k.v.a. and each having its primary (7200 v.) winding connected in series with one of the conductors of the three-phase transmission line and the three secondary windings (440 v.) being connected in broken delta, and connected to a full wave rectifier 70. By suitable step-down transformation and adjusting means indicated at 71 rectified alternating current was supplied at the junction of the broken delta.

The data shown in Fig. 12a was obtained at a constant load L although this load was not perfectly balanced; current measured in conductors 66a was 13 amperes, that in conductor 66b was 10 amperes and that in 66c was 11 amperes. The voltage level of the second, third, fourth and fifth harmonics of the fundamental 60 cycle current was read at the load from each phase to neutral as shown by the arrows. With this setup, measurements were made of the harmonic content as the direct current bias applied via rectifier bridge 70 to the secondary circuit of the harmonic signal generator was varied from a low value to beyond the point which produced saturation of the inductors 69a, b and c. Referring to Fig. 12a, it will be seen that all harmonics except the third dropped off sharply at saturation; the third harmonic remained substantially constant through the whole range and was not induced in any way by my harmonic signal inductor. It was, in other words, the ambient level of third harmonic in the system. The third harmonic which was produced by my harmonic signal inductor was balanced and was blocked by the delta connection of the windings of the transformers which supplied the load.

When the alternating current supplied to the rectifier bridge 70 was interrupted, the signals produced were at the levels indicated by line 72 in Fig. 12a. Under this condition, second harmonic was predominant while fourth and fifth harmonics were close to the same level; in other tests run under slightly different load conditions, the fourth harmonic predominated substantially over the fifth. Between line 72 and the point of saturation, the additional benefits gained by supplementing self-excitation with externally applied rectified alternating current will be noted. In all of the tests I have run, the strongest signal voltages of these three harmonics fell in the range where the reactor excitation ratio was between unity and 1.4.

It will be understood, of course, that all of the measurements referred to hereinbefore were made with the switch 73 open. The results of the test demonstrate the fact that when my harmonic signal inductor is connected in the fashion shown the signals which it transmits to the load are predominantly second harmonic; a substantial signal strength of fourth harmonic is obtained and a very satisfactory strength of fifth harmonic. Third harmonic on the other hand, is suppressed to the point where the only readings obtainable were those reflecting the ambient level of this particular harmonic in the transmission line. The readings taken on third harmonic varied from phase to phase and were averaged for graphical representation in Fig. 12a; the other harmonics, however, were substantially equal for all three phases despite the unbalance of the load.

While, so far as signal transmission is concerned, third harmonics are suppressed by the arrangement shown in Fig. 12, it may perhaps be recognized that they contribute in a very major fashion to the second and fourth harmonics which are induced in the line. This derives from the manner in which the secondary windings of reactors 69a, b and c are connected. In a closed delta arrangement of the secondary windings the third harmonic voltages induced in them are in conjunction and will cause a third harmonic current to circulate in the delta. This current has no electric circuit upon which it can react and it will, therefore, act as a third harmonic magnetizing current for the core and will suppress the third harmonic in the induced voltage. When the delta is opened, however, as is done in my harmonic signal inductor, a large third harmonic voltage will appear across the gap since with respect to one another the third harmonics in the three transformers are 3×120=360° apart in phase, this voltage will be equal to three times the third harmonic voltage appearing in one phase. The third harmonic voltage in each transformer may be as great as 50 percent of the voltage rating of the transformer. Actually then it will be seen that it is the odd triple harmonics, primarily third, produced by opening the delta arrangement of the secondaries that appears across the full wave rectifier. The direct current thus produced in the secondaries results in self-excitation which is effective in producing even harmonics in the resultant signal.

Referring now to Fig. 12b, let it be explained that in obtaining the data from which these curves were prepared the alternating current supplied to rectifier bridge 70 of Fig. 12 was reduced to zero so that the signals produced were entirely the result of self-excitation of reactors 69a, b and c. In this test load L was varied from virtually no load to beyond the rated capacity of the system feeding this load. The significance of the curves therefore will be immediately evident for the reason that at all loads above 5 percent of rated capacity the level of the second harmonic voltage and the fourth harmonic voltage measured at the load remained virtually constant. In other words, it is evident that my harmonic signal inductor is self-regulating to produce a uniform signal level at the load regardless of the magnitude of the load.

For the purpose of determining propagation of second and fourth harmonics along actual transmission lines, specimen lines of various lengths have also been simulated in power system analyzer studies made with a view to evaluating use of these even harmonics as proposed herein. For each length of line analyzed a source signal comprising the desired harmonic was applied to the line at the sending end and measurements of voltage and current then were made at discrete points along the line.

The results of one such study are reproduced graphically in Fig. 12c. The particular power line considered in this case was a three-phase 115 kv. line 1550 miles long; the conductors were 266,800 circular mils steel reinforced aluminum cable with a conductor spacing of 17.05 feet. The line was terminated at its distant end by a load that would draw the full current rating of the transmission line if placed near the source.

It may be noted that the points of minima for both harmonics occur at the quarter wave length points, those for the fourth harmonic (240 cycles) occurring where there is a relatively high value of second harmonic (120 cycles) while the quarter wave minimum of the latter occurs at the half-wave maximum of the former. With transmission lines of different length and different loading the relationships can shift somewhat but the general conclusion can be reached that points of minima do not coincide in practice. Thus, if both harmonics are used as the transmission signal, "skip" zones are completely avoided and it will be quite evident that such use of the two harmonics in conjunction with one another as a signal can be useful in situations where there may be a danger of skips or blind spots if one frequency is used alone as the signal. In Fig. 12c it is mainly the first four hundred mile zone which is significant inasmuch as this represents about the maximum actual length of transmission line encountered in practice without a load or generator connection. As will be explained hereinafter, network analyzer studies also have been made with respect to actually existing networks covering a large area thus to supplement the information gained regarding transmission lines as such.

In connection with Fig. 12b it was explained that the curves reflect the results obtained when the reactors in my harmonic signal inductor were self-excited alone, there being no supplemental or augmented direct current excitation of the "broken delta" secondary windings. This is the arrangement shown in Fig. 13 which, because it differs from the circuit in Fig. 12 only by the elimination of supplemental excitation, should require no discussion beyond that which has already been given. It might be mentioned that in Fig. 13 the harmonic signal inductor is shown as connected in the lines fed by a delta connected secondary of an upstream transformer; actually from the standpoint of the operation of my unit it can readily be connected to any three-phase line and either on the primary or secondary side of any transformer feeding the line or being fed by it regardless of whether the transformer is connected delta-Y, delta-delta, Y-delta, or Y-Y. Practical considerations ordinarily will make it advisable to connect the harmonic signal inductor into the line on the low voltage side of the transformer rather than the high voltage side and as will be explained hereinafter, there is an advantage that sometimes can be gained by selecting the Y side, this advantage also being one which grows out of practical considerations rather than operational characteristics. So far as its ability to transmit even harmonics is concerned, there is complete freedom of choice making my harmonic signal inductor extremely flexible as regards point of application to the power network.

Figure 13:
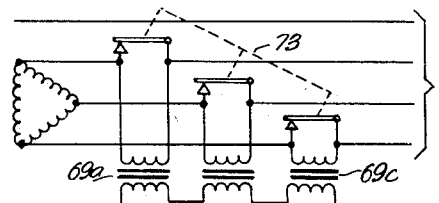
Figure 14:
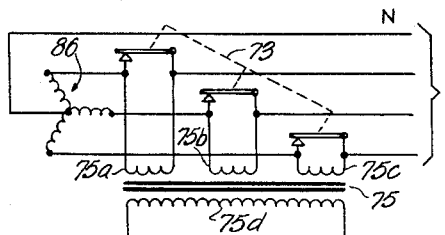

The arrangement shown in Fig. 14 is very similar to that of Fig. 13 and virtually identical in results. The difference resides in the fact that whereas Fig. 13 employs three separate reactors 69a, 69b and 69c whose secondaries are connected in broken delta with a rectifier at the junction point, Fig. 14 makes use of a single unitary reactor whose core 75 has a common return path for the flux induced by the three primary windings 75a, b and c, the secondary winding 75d being mounted on the portion of the core comprising this common return path. The core may, for example, take the form of a straight section of magnetic material having three C-shaped sections joining it at its opposite ends whereby the straight section is the common return path for flux in the three C-shaped sections; the secondary winding 75d is, as mentioned, wound on the common return path while the three primary windings are wound on the individual C-shaped sections. With this arrangement operation equivalent to that obtained by connecting three individual reactors with their secondaries in broken delta is obtained.

Figure 15:
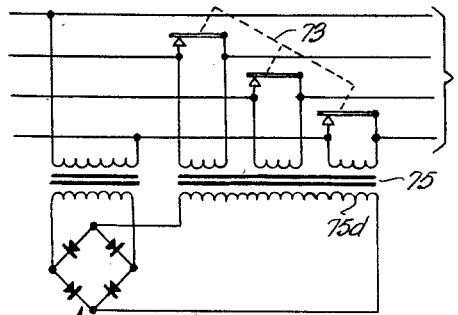

The harmonic signal inductor shown in Fig. 15 employs the same kind of unitary reactor 75 but in this case the secondary winding 75d enjoys supplemented self-excitation. This is accomplished by substituting for the single rectifier 74 a full wave rectifier bridge 76 adapted to receive alternating current power from the supply line on which my harmonic signal inductor is installed. The results obtained are essentially similar to those obtained with the arrangement of Fig. 12 except that there is no provision for variation in the degree of supplemental excitation. This actually is not necessary in practice for it will be understood that in any given installation the supplemental excitation will be determined upon the basis of existing conditions and the components designed to bring the harmonic signal inductor into the most favorable portion of the supplemented self-excitation region of its curve (see Fig. 12a). Roughly speaking, it may be said that where supplemented self-excitation is employed the supplemental exciting current should be about one-half of the value of the 60 cycle power current flowing in the line multiplied by the ratio of the primary turns to the secondary turns on the reactor. Stated differently, it should supply approximately one-half as many D.C. ampere turns as there are effective A.C. ampere turns. If this is exceeded there is a tendency for the core of the reactor to become completely saturated when subjected additionally to self-excitation (which provides approximately one-half of the ideal excitation).

Figure 16:
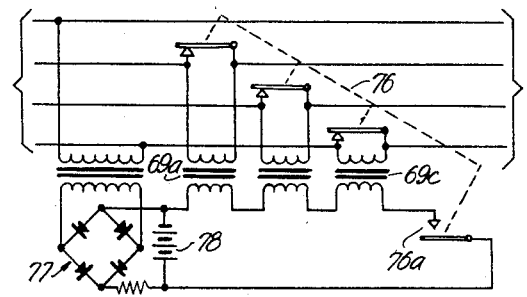

Fig. 16 represents a modification which, upon operation of a switch 76, serves to transmit a signal in which the even harmonic components are the same as have been described but the third harmonic content of the signal will be even further suppressed. This arrangement employs no self-excitation. The rectifier bridge 77 is merely for trickle charging the battery 78 through the resistor 79, the latter being sufficiently high in value to prevent the rectifier bridge from having any substantial effect in exciting the reactors 69a, b and c when contact 76a closes. The D.C. excitation of the reactors therefore is accomplished solely by the battery 78. The battery also affords a short circuit path for the third harmonics; that is to say, the secondary windings of the reactors are in effect in closed delta with respect to these. At the same time it provides a direct current bias on the secondary windings of the reactors, the magnitude of which is sufficient to cause the transmitted signal to have a very substantial content of second and fourth harmonics.

Figure 17:
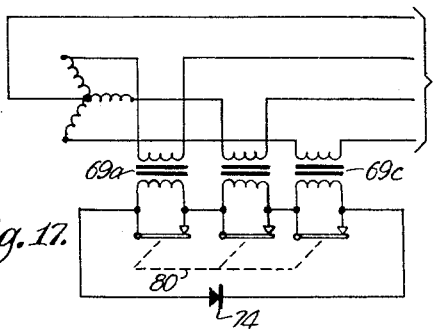

The harmonic signal inductor shown in Fig. 17 is, during signal transmission, identical to that shown in Fig. 13 when switch 73 is opened. The difference of course resides in the fact that the Fig. 17 embodiment employs switching in the secondary circuit rather than in the primary circuit of the reactors. The advantages of secondary switching over primary switching have already been discussed in connection with single phase versions of my harmonic signal inductor. In the three-phase arrangement switching by contacts 80 as shown in Fig. 17 actually have an even greater advantage over switching by contact 73 as in Fig. 13 because primary voltages to ground are sometimes extremely high in three-phase circuits and even though the switched voltage is low, the isolation voltage is high. Lower primary voltage ratings can be expected for comparable devices employed on single-phase circuits; lower cost and greater latitude of design thus can be obtained with the Fig. 17 harmonic signal inductor because the only voltage consideration for switch 80 is the voltage across the secondary winding.

Figure 18:
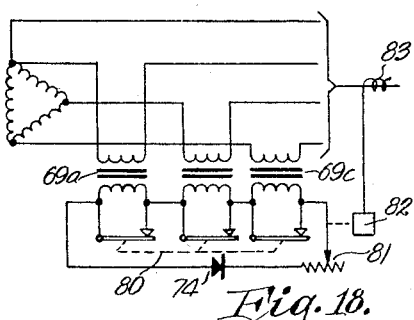

From an operational standpoint the unit shown in Fig. 18 is precisely like that of Fig. 17 save only for the fact that a variable resistor 81 has been introduced in the broken delta secondary winding hookup. The amount of resistance which is added in series with rectifier 74 is controlled by a conventional control unit sensing the power flow in the line by current transformer means 83. Because of the excellent regulation ordinarily obtained without such an auxiliary control this usually is not needed but there are occasions in which it is advantageous as for example where there is a relatively high impedance between the signal source and the load.

Figure 19:
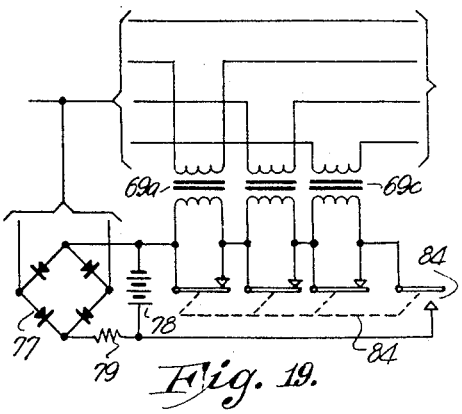

Fig. 19 discloses an arrangement employing secondary switch in order to initiate and terminate signals, the secondary switch 84 having a normally open contact which closes to provide D.C. excitation under the influence of battery 78. The full wave rectifier 77 and resistor 79 are only for the purpose of trickle charging the battery in long stand-by periods; other than for the provision of secondary switching the operational characteristics of the harmonic signal inductor of Fig. 19 will be readily apparent from the explanation heretofore given in connection with Fig. 16.

Figure 20:
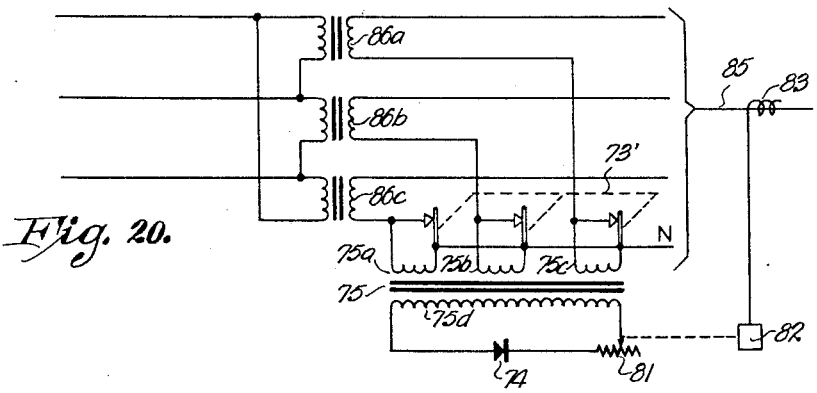

As is true in the case of the embodiment shown in Fig. 18, the harmonic signal inductor disclosed in Fig. 20 employs in series with the rectifier 74 a variable resistor 81 which is controlled by the conventional unit 82 to increase or decrease the level of self-excitation during signaling in accordance with the load on the power line 85 as measured by current transformer 83. As will be understood from the earlier discussion, the variable resistor may or may not be needed in order to obtain adequate regulation of the level of the transmitted signal; if not needed, it naturally should be eliminated in the interest of obtaining maximum simplicity. It may be thought that if this is done the harmonic signal inductor of Fig. 20 will become the exact counterpart of that shown in Fig. 14 but there is a very significant difference between the two which I wish to bring out. It is true that signaling is controlled by a switch 73' which like the switch in the Fig. 14 arrangement normally short circuits the primary windings 75a, b and c; it also is true that the harmonic signal inductor of Fig. 20 is located on the downstream side of a transformer having a Y connected secondary as is true in the case of Fig. 14. The important difference between the two figures resides in the relative position of each primary winding of the asymmetric reactor with reference to the neutral point of the Y connected secondary windings of the transformer in the power line. In Fig. 14 it will be seen that the neutral conductor comes directly to the junction between the three secondary windings of the transformer 86. When switch 73 of Fig. 14 is open the primary windings of the reactor are connected in series with the respective high voltage conductors terminating at the outer ends of the power transformer winding.

In Fig. 20, however, this relationship has been transposed. It is the reactor windings 75a, b and c which are connected directly to the neutral lead N and when switch 73' is opened for signaling the opposite end of each of these windings is connected to the associated power transformer winding (86a, b and c) and thence to the high voltage conductors of the line. Stating the matter more simply, each of the reactor windings is between the corresponding power transformer winding and neutral (N) in Fig. 20 whereas in Fig. 14 the same winding is between the power transformer winding and the high voltage line to which the latter is connected.

From the standpoint of operation both arrangements function equally well and the results are the same so far as the type of signal produced by the harmonic signal inductor. The substantial advantage which the Fig. 20 arrangement has over that of Fig. 14 resides simply in the fact that it is connected to the low voltage end of the associated transformer winding rather than the high voltage end. As a result the actual voltage levels at the ends of the reactor windings are only the very small voltage which appears across the reactor winding itself; and because of this the Basic Insulation Level (B.I.L.) of the reactor windings can with safety be very much lower than the Basic Insulation Level required in the case of the Fig. 14 arrangement. The voltage level at the ends of the reactor windings is not just the voltage developed across that winding but also the voltage developed by the winding of the power transformer too. It follows from this that a very marked saving in cost can be realized if the reactor windings can be inserted between neutral (N) and the transformer windings rather than vice versa.

This is not always possible. In some commercial three-phase power transformers the Y connected windings are joined internally and only the neutral tap is brought out of the casing. In such instances it is not possible without modification of the existing transformer to introduce the reactor windings between neutral and the transformer windings. However, if the transformer windings are provided with separate external taps at the neutral end as well as the high voltage end the insertion can be made just as well at one end as the other. Again where the voltage transformation in the power line is effected not by a unitary three-phase transformer but by three single phase transformers which have windings normally connected in Y it is a simple matter to effect the insertion of the reactor windings between neutral and that end of the transformer windings which normally would be connected to neutral. As previously suggested, the benefit in doing this can be very substantial as regards reducing cost of the reactors without in any way impairing their function as producers of the desired harmonic signals. From this explanation it should be understood that while for simplicity the reactor windings shown in Figs. 13–19 have been shown as inserted at the high voltage end of the winding, it is preferable wherever possible to effect the insertion at the low voltage end of the power transformer winding.

Figure 21:
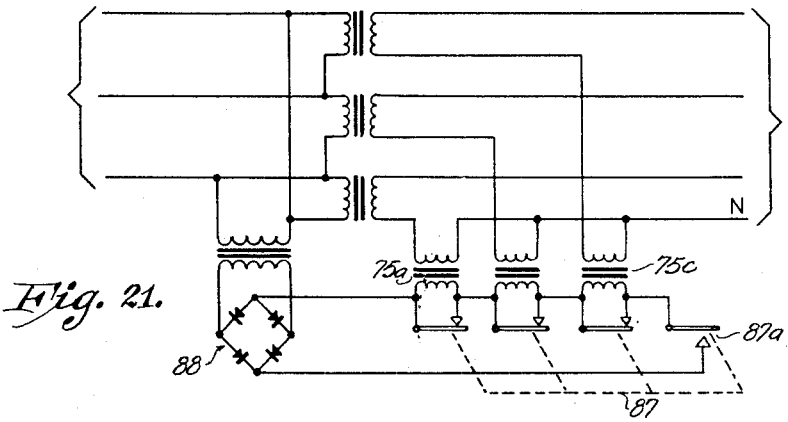

This very desirable feature has also been illustrated in Fig. 21. In this instance initiation and termination of signaling is not effected by switching associated with the primary windings of the reactors 75a, b and c but by a switch 87 having contacts that normally short circuit the secondary windings. This switch also has a normally open contact 87a which closes upon initiation of signaling and completes a circuit to the rectifier 88. During signaling, in other words, the harmonic signal inductor has self-excitation supplemented by the rectified alternating current supplied by the rectifier bridge. As we have seen before this results in a signal containing substantial amounts of even harmonics along with a substantial level of fifth harmonic (see Fig. 12a). When switch 87 restores to normal to terminate signaling contact 87a reopens so the rectifier bridge 88 consumes no power in stand-by operation.

Figures 22, 24:
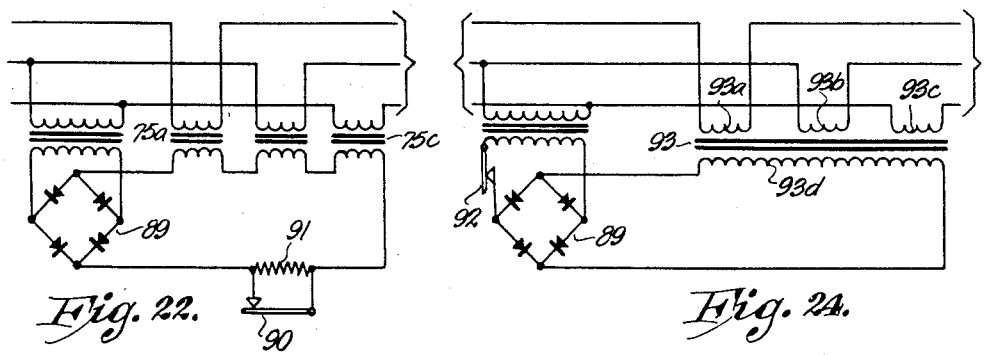
Figure 23:
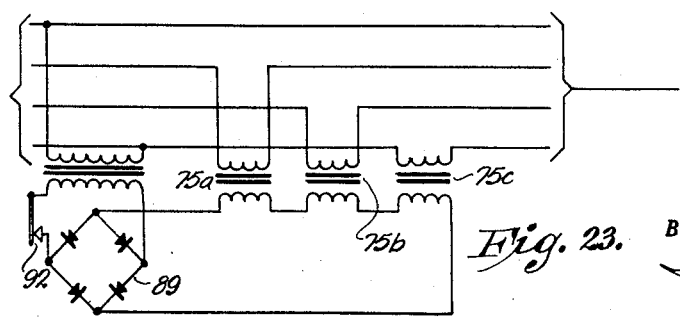

The harmonic signal inductors shown in Figs. 22, 23 and 24 are alike in that none of them perform the changeover from non-signaling to signaling condition by means of switches normally bridging either the primary or secondary windings of the asymmetric reactors shown therein. Instead, all of them rely upon the same basic switching principle fully discussed hereinbefore in connection with Fig. 11. Taking Fig. 22 as an example a full wave rectifier 89 is employed to impress upon the "broken delta" secondary windings of rectifiers 75a, b and c a direct current of sufficient magnitude to drive the reactors far enough into saturation to prevent the alternating magnetomotive force in the primary windings from having any effect. Thus under normal non-signaling conditions the three reactors present little if any impedance to the current flowing in the conductors of the line to which they are connected. However, when contact 90 is opened to initiate signaling, resistor 91 serves to reduce the direct current excitation to a value which brings the reactors within the "self-excitation supplemented" region of the curves shown in Fig. 12a so that substantial levels of second, fourth and fifth harmonics are induced in the line. Under this condition resistor 91 serves to control both the amount of self-excitation and the amount of supplemental excitation derived from the rectified alternating current supplied to the secondary windings by bridge 89. Reclosing of contact 90 short circuits the resistor causing the rectifier bridge once more to drive the reactors into the high degree of saturation which terminates transmission of the signal and restores the circuit to its original condition.

With the foregoing explanation in mind, it will be apparent that the harmonic signal inductor of Fig. 23 operates on generally the same basis; however, the signal controlling contact 92 now is in the alternating current supply to the rectifier bridge 89 so that upon opening the contact to initiate signaling the harmonic signal inductor operates purely on the basis of self-excitation without any supplementary excitation as was afforded in the arrangement of Fig. 22. Precisely the same mode of control is employed in Fig. 24, the only difference between this embodiment of my unit and that shown in Fig. 23 residing in the substitution of a unitary reactor 93 for the three reactors shown in Fig. 23. The reactor 93 of Fig. 24 is of the same basic construction and operation as has been explained heretofore in connection with Figs. 14 and 15 so the manner in which it functions will be understood without further explanation.

Fig. 25 is a single line representation of a power network. This representation is similar to a network which was studied by means of a power system network analyzer but has, of course, been simplified considerably. The area 100 surrounded by the dot-dash line is the area toward which the signaling effort is directed. Area 110, surrounded by the dotted line represents a power generating plant with switching facilities.

Harmonic signal inductors may be located at many different positions within the network to provide adequate harmonic signal levels within area 100. There are, however, three basic types of location for insertion of harmonic signal indicators. Locations A are placed as close to the 60 cycle generating sources as possible and are situated in the lines through which 60 cycle power may be fed into area 100. Wherever possible, the harmonic signaling inductors have been located at the lower primary voltage levels. Having a 100 percent harmonic signal input, 50 to 100 percent signals would appear at the loads L. Even at a remote city 103 which is 160 miles distant from the main generating plant 110, the signal would be 10 percent. At a city 104 and 105 which has no generating plant and which is relatively close to area 100, the signal level was measured at 50 percent. At cities 101, 102 and 103 which have power generating plants, the signal level was reduced by the presence of these generating plants since the generators absorb much of the signal which is available. The main advantage of locating my harmonic signal inductors at points A is that the signal coverage is very broad and the number of insertion points is relatively small.

If it is desired to signal only area 100 with very little measurable signal outside the area, points C represent a very effective signaling insertion point. They are in the lower voltage lines leading from bulk substations 111 and will produce similar signals 50 to 100 percent in most of the area 100 except for loads fed from the 5 kv. bus in generating plant 110 where the signal level was measured at 25 to 30 percent. This upstream signal is smaller than the downstream signal because the upstream impedance in this instance is considerably smaller than the downstream impedance. For this particular power network, points C represent a better insertion point than points A because there are fewer units having a smaller total rating.

Points B insertion offer the most flexible approach of all. The area reached by having all points B, which are located at distribution substations 112, is essentially the same as for points C but the signal voltage at loads L does not fall below 60 percent of the input signal. On the surface it would appear that this small gain in signal level would not compensate for the much greater number of harmonic signaling inductors but there are further factors to consider. Not all substations need to receive a signal since some feed loads which are entirely industrial. In many instances, it is desirable to signal only small areas fed from one or more substations rather than the entire area 100. And the points B offer the only possibility to do this. Insertion at both points B and C produces essentially the same magnitude of signal upstream. If it is not necessary to have this upstream signal, essentially all of the upstream signal may be transferred toward the downstream direction. This results in a 90 percent of input signal at the load. The technique which is used to eliminate most of the upstream effects I have termed "cross-polarization." Consider the instance of two equal substations having no downstream interconnections and a low impedance upstream connection. If one of these substations is polarized with one direction of excitation while the other one is polarized in the opposite direction, the upstream currents will be essentially opposite in phase position and will cancel and the downstream signal will be equal to the voltage measured across the harmonic signaling indicator. When all of the substations to be signaled have been cross-polarized, the upstream signal will result from the small unbalances accumulated from each pair of substations but will be very small in magnitude.

In each power system the network is different and a choice between A, B or C locations must be made on the basis of local conditions.

From the foregoing it will be seen that this invention is one well adapted to attain all of the ends and objects hereinbefore set forth together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as it is quite evident that numerous possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. In an electric power distribution network of the public utility type wherein the power is supplied by a plurality of alternating current generators which are network-interconnected for synchronous parallel operation; the improvement which comprises a plurality of geographically separated signal initiating stations connected to different power supply lines in said network, a signal receiving station connected to still another power line in said network, said network including at least one connection between said last line and each of said first lines thereby to provide multiple signaling paths between said signal initiating stations and said signal receiving stations, and means at each signal initiating station for inducing in the power line at the point to which it is connected, a signal comprising a plurality of harmonics of the power voltage wave in the line at that point, the phase relationship of the respective harmonics to said power voltage wave being substantially the same at all of said signal initiating stations.

2. A combination as in claim 1 wherein said signal comprises at least the second and fourth harmonics of the power voltage wave at the point of origination of said signal.

3. In an electric power distribution network of the public utility type wherein the power is supplied by a plurality of alternating current generators which are network interconnected for synchronous parallel operation; the improvement which comprises a plurality of geographically separated signaling stations connected to different power supply lines in said network, a signal receiving station connected to still another power line in said network, said network including at least one connection between said last line and each of said first lines thereby to provide multiple signaling paths between said signaling stations and said signal receiving station, each signaling station having a signaling condition and a non-signaling condition, the impedance which each signaling station offers to the line to which it is connected being substantially zero under one of said conditions, means at each signaling station operative under the other of said conditions to substitute for said zero impedance of that station an asymmetric inductance, and said signal receiving station being selectively responsive to a predetermined signal frequency band comprising an even harmonic of the fundamental frequency at which power is supplied to said network by said generators.

4. In an electric power distribution network of the public utility type wherein the power is supplied by a plurality of alternating current generators which are network interconnected for synchronous parallel operation; the improvement which comprises a plurality of geographically separated signaling stations connected to different power supply lines in said network, a signal receiving station connected to still another power line in said network, said network including at least one connection between said last line and each of said first lines thereby to provide multiple signaling paths between said signaling stations and said signal receiving station, each signaling station having a signaling condition and a non-signaling condition, the impedance which each signaling station offers to the line to which it is connected being substantially zero under one of said conditions, means at each signaling station operative under the other of said conditions to substitute for said zero impedance of that station an asymmetric inductance, and said signal receiving station being selectively responsive to a predetermined signal frequency pattern comprising the second and fourth harmonics of the fundamental frequency at which power is supplied to said network by said generators.

5. In an electric power distribution network of the public utility type wherein the power is supplied by a plurality of alternating current generators which are networked interconnected for synchronous parallel operation; the improvement which comprises a plurality of geographically separated signaling stations connected to different power supply lines in said network, a plurality of signal receiving stations connected to still other power lines in said network, said network including at least one connection between each of said last lines and each of said first lines thereby to provide multiple signaling paths between said signaling stations and said signal receiving stations, each signaling station having a signaling condition and a non-signaling condition, the impedance which each signaling station offers to the line to which it is connected being substantially zero under one of said conditions, means at each signaling station operative under the other of said conditions to substitute for said zero impedance of that station an asymmetric inductance, and each of said signal receiving stations being selectively responsive to a predetermined signal frequency band comprising an even harmonic of the fundamental frequency at which power is supplied to said network by said generators.

6. In an electric power distribution network of the public utility type wherein the power is supplied by a plurality of alternating current generators which are network interconnected for synchronous parallel operation, the improvement which comprises a plurality of geographically separated signaling stations connected to different power supply lines in said network, a plurality of signal receiving stations connected to still other power lines in said network, said network including at least one connection between each of said last lines and each of said first lines thereby to provide multiple signaling paths between said signaling stations and said signal receiving stations, each signaling station having a signaling condition and a non-signaling condition, the impedance which each signaling station offers to the line to which it is connected being substantially zero under one of said conditions, means at each signaling station operative under the other of said conditions to substitute for said zero impedance of that station an asymmetric inductance, and each of said signal receiving stations being selectively responsive to a predetermined signal frequency band comprising an odd harmonic of the fundamental frequency at which power is supplied to said network by said generators.

7. In an alternating current power supply system, a power transmission line having a load connected thereto, a source of alternating current power also connected to said line at a point removed from said load for supplying power to the load via said line, said line having a signal transmitting station intermediate said source and said load, means at said station for inducing in said line a signal comprising at least the second harmonic of the power voltage wave at said intermediate point, said last means comprising an inductive reactor having a core of magnetic material, a winding on said core connected to said line and effective to apply to the core an alternating magnetomotive force whose instantaneous peak value exceeds the value required to drive said core into saturation, and means for applying to said core, during the application of said alternating magnetomotive force thereto, a unidirectional magnetomotive force to produce asymmetry of flux in said core.

8. A system as in claim 7, wherein said winding is so connected to said line as to be in series with one conductor thereof.

9. In an alternating current power supply system, a power transmission line having a load connected thereto, a source of alternating current power also connected to said line at a point removed from said load for supplying power to the load via said line, said line having a signal transmitting station intermediate said source and said load, means at said station for inducing in said line a signal comprising at least the fourth harmonic of the power voltage wave at said intermediate point, said last means comprising an inductive reactor having a core of magnetic material, a winding on said core connected to said line and effective to apply to the core an alternating magnetomotive force whose instantaneous peak value exceeds the value required to drive said core into saturation, and means for applying to said core during the application of said alternating magnetomotive force thereto a unidirectional magnetomotive force to produce asymmetry of flux in said core.

10. In an alternating current power supply system a power transmission line having a load connected thereto, a source of alternating current power also connected to said line at a point removed from said load for supplying power to the load via said line, said line having a signal transmitting station at a point intermediate said source and said load, means at said station for inducing in said line a signal comprising a plurality of harmonics of the power voltage wave at said intermediate point, said last means comprising an inductive reactor having a core of magnetic material, a winding on said core connected to said line whereby it is effective to apply an alternating magnetomotive force to the core, and said core having a B/H curve which is asymmetrical with respect to said alternating magnetomotive force.

11. In an alternating current power supply system, a power transmission line having a load connected thereto, a source of alternating current power also connected to said line at a point removed from said load for supplying power to the load via said line, said line having a signal transmitting station at a point intermediate said source and said load, means at said station for inducing in said line a signal comprising at least the second and fourth harmonics of the power voltage wave at said intermediate point, said last means comprising an asymmetric inductance connected to said line.

12. In an alternating current power supply system, a power transmission line having a load connected thereto, a source of alternating current power also connected to said line at a point removed from said load for supplying power to the load via said line, said line having a signal transmitting station at a point intermediate said source and said load, means at said station for inducing in said line a signal comprising at least one even and one odd harmonic of the power voltage wave at said intermediate point, said last means comprising an asymmetric inductance connected to said line.

13. In an alternating current power supply system, a power transmitting line having, at a particular point along its length, a signaling station through which alternating current power passes en route from an upstream source to a downstream load, said station having a signaling condition and a non-signaling condition, the impedance of said station to said line being substantially zero under one of said conditions, and means operative under the other of said conditions to substitute for said zero impedance an asymmetric inductance.

14. A system as in claim 13 wherein said asymmetric inductance comprises a core of magnetic material having a pair of windings theron, one of said windings being connected to said line, the other winding being bridged by a rectifier.

15. A system as in claim 14 wherein said rectifier has a resistor in series therewith.

16. A system as in claim 15 having means controlled by the magnitude of said downstream load for varying the resistance of said resistor in accordance therewith.

17. A system as in claim 13 wherein said inductance comprises a core of magnetic material having a pair of windings thereon, one of said windings being connected to said line, and a source of direct current connected to the other winding to energize same.

18. A system as in claim 17 wherein said direct current source comprises a battery in series with a rectifier.

19. A system as in claim 17 wherein said direct current source comprises a full wave recifier connected to said line to receive alternating current therefrom and connected to said other winding to feed rectified alternating current thereto.

20. A system as in claim 13 wherein said inductance comprises a core of magnetic material having a pair of windings thereon, one of said windings being connected to said line, a rectifier bridge connected to the ends of the other winding, all of the rectifiers in said bridge being so polarized as to block current flow through said other winding in one direction and permit it to flow in the opposite direction.

21. A system as in claim 20 having a source of alternating current connected to said bridge.

22. A system as in claim 13 wherein said inductance comprises a core of magnetic material having a pair of windings thereon, one of said windings being connected to said line, the other winding being bridged by a rectifier, and means controlled by the magnitude of said downstream load for varying the ratio of the turns of said windings in accordance therewith.

23. A system as in claim 13, wherein said asymmetric inductance comprises a core of magnetic material having a pair of windings thereon, one of said windings being connected to said line so it is in series with one conductor thereof, a circuit bridging said other winding, said circuit including rectifier means to substantially block current flow in one direction through said other winding.

24. In an alternating current power supply system, a power transmission line having, at a particular point along its length, a signaling station through which alternating current power passes en route from an upstream source to a downstream load, means at said station for inducing in said line a signal comprising at least one predetermined harmonic of the voltage wave at said point, said means comprising an inductive reactor having a core of magnetic material, a pair of windings on said core, one of said windings being connected to said line and the other winding being bridged by a circuit including a rectifier, and means for reducing the effective inductance of said one winding to substantially zero to terminate the production of said harmonic signal in said line.

25. In an alternating current power supply system, a power transmission line having, at a particular point along its length, a signaling station through which alternating current power passes en route from an upstream source to a downstream load, means at said station for inducing in said line a signal comprising an even harmonic of the voltage wave at said point, said means comprising an inductive reactor having a core of magnetic material, a pair of windings on said core, one of said windings being connected to said line and the other winding being bridged by a circuit including a source of direct current and a rectifier in series with said direct current source, said rectifier being polarized to permit flow of direct current through said other winding from said source, and means for reducing the effective inductance of said one winding upon said line to substantially zero to terminate the production of said harmonic signal in said line.

26. In an alternating current power supply system, a three-phase power transmission line having, at a particular point along its length, a signaling station through which alternating current power passes en route from an upstream source to a downstream load, means at said station for inducing in said line at least one predetermined harmonic of the power supply voltage, said means comprising a plurality of inductive reactors each having a primary winding and a secondary winding, said primary windings being connected to said line so each is energized by current in a different phase thereof, the secondary windings of said reactors being connected in broken delta, and a rectifier bridging the ends of said broken delta.

27. A system as in claim 26 having means for normally short circuiting the primary windings of said reactors but operable to remove the short circuit.

28. A ssytem as in claim 26, having means for normally short circuiting the secondary windings of said reactors but operable to remove the short circuit.

29. A system as in claim 26, having means for applying an external D.C. voltage across the ends of said broken delta.

30. A system as in claim 26, wherein the primary windings of said reactors are so connected to said three-phase line that each winding is in series with a different power transmission conductor of that line.

31. In an alternating current power supply system, a three-phase power transmission line having, at a particular point along its length, a signaling station through which alternating current power passes en route from an upstream source to a downstream load, means at said station for inducing in said line at least one predetermined harmonic of the power supply voltage, said means comprising a plurality of inductive reactors each having a primary winding and a secondary winding, said primary windings being connected to said line so each is energized by current in a different phase thereof, the secondary windings of said reactors being connected in broken delta, a full wave recifier bridge having a source of alternating current connected to opposite points thereof, the remaining opposite points being connected to opposite ends of said broken delta.

32. A system as in claim 31, wherein the primary windings of said reactors are so connected to said three-phase line that each winding is in series with a different power transmission conductor of said line.

No references cited.